US006594212B2

United States Patent
Kimura et al.

(10) Patent No.: US 6,594,212 B2
(45) Date of Patent: Jul. 15, 2003

(54) REPRODUCING DEVICE WITH CROSS-FADING OPERATION

(75) Inventors: Tomomichi Kimura, Kawagoe (JP); Kazunori Matsuo, Kawagoe (JP); Shinichi Naohara, Kawagoe (JP); Yasutaka Suzuki, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 368 days.

(21) Appl. No.: 09/725,179

(22) Filed: Nov. 29, 2000

(65) Prior Publication Data

US 2001/0002183 A1 May 31, 2001

(30) Foreign Application Priority Data

Nov. 29, 1999 (JP) ............................................. 11-337989

(51) Int. Cl.[7] ............................................. G11B 27/03
(52) U.S. Cl. .................... 369/47.32; 369/47.27
(58) Field of Search ..................... 369/3, 47.13, 47.31, 369/47.34, 83, 47.32, 47.33, 53.31, 47.27, 30.07, 30.08, 30.09, 30.23

(56) References Cited

U.S. PATENT DOCUMENTS 5,377,167 A * 12/1994 Maeda et al. ............ 369/47.28
5,581,530 A * 12/1996 Iizuka et al. .................... 369/93
5,974,015 A * 10/1999 Iizuka et al. ............. 369/47.16

FOREIGN PATENT DOCUMENTS

| JP | 02285576 A | * 11/1990 |
| JP | 05159539 A | * 6/1993 |
| JP | 06150624 A | * 5/1994 |
| JP | 07153189 A | * 6/1995 |
| JP | 9-134586 | 5/1997 |

* cited by examiner

Primary Examiner—Thang V. Tran
(74) Attorney, Agent, or Firm—Morgan, Lewis & Bockius LLP

(57) ABSTRACT

A reproducing apparatus and method for continuously reproducing data including a memory configured to store at least heading portions of respective data groups from one or more data groups recorded on a recording medium; a reproducing device configured to read at least the heading portions of one or more of the data groups from the recording medium; and a controller configured to control the memory and the reproducing device, and configured to execute a cross-fading operation, in which a portion of at least one of the data groups being reproduced from the memory are cross-faded with a portion of at least one of the data groups being reproduced from the recording medium by the reproducing device.

20 Claims, 12 Drawing Sheets

REPRODUCING DEVICE WITH CROSS-FADING OPERATION

This application claims the benefit of Japanese Patent Application No. 11-337989, filed Nov. 29, 1999, which is hereby incorporated by reference.

BACKGROUND OF THE INVENTION

1. Field of the Invention

The present invention relates to a reproducing device having a memory, such as a hard disk drive or the like, and a recording medium player, such as a compact-disk (CD) or digital versatile disk (DVD) player. Particularly, the invention relates to a reproduction device that effectively performs a cross-fading operation between data groups.

2. Discussion of the Related Art

The current availability of high density and relatively low priced hard disk (HDD) drives has allowed for the utilization of such HDD's as not only external storage units for personal computers, but also as a storage device for relatively large amounts of audio data. As a result, audio products utilizing HDD's are becoming more and more common.

For example, recent music editing devices utilize HDD's for storing digital reproduction audio data (sometimes referred to as voice data) in advance from recording media that are loaded in the editing device. These recording media may be compact discs, for example. These music editing devices allow for reading and reproducing the voice data from the hard disk. According to this type of device, it is not necessary to exchange recording media upon reproduction of the reproduction data from the device. As a result, continuous reproduction can be effectuated in a relatively straightforward manner, although the size of the related devices are enlarged.

In a recording media disc changer provided with an HDD, on the other hand, there has been proposed a reproducing device that operates such that heading voice data corresponding to respective data groups, or data tracks, recorded on a recording medium, such as a compact disc, for example, are recorded in advance in the HDD from the recording medium. Since they are selectively read and reproduced, as an output signal, it is not possible to interrupt the play operation during a disk searching operation or a disc changing operation. Accordingly, the output signal is replaced by the reproduction (voice) data of the corresponding CD when the disc search or changing operation is ended. This reproducing device is disclosed in detail in Unexamined Published Japanese Patent Application No. 9-134586, for example.

FIG. 12 is a timing chart illustrating the aforementioned control to be made by the aforementioned reproducing device of the prior art. Here will be specifically described one example, in which heading data ($A_0$ to $A_{(n-1)}$) of each song on a CD, for example, is recorded in HDD in advance, and in which one CD is searched from one music track (track a) to another music track (track b), for example.

While the voice data of the CD track a are being reproduced, they are read out at first by a pickup unit 2 (see (c) of FIG. 12), and are written in a buffer memory, from which they are continuously read so that their reproduced sound is outputted from speakers (see (d) and (e) of FIG. 12). In response to an acceptance of a search (disk change) command, the voice data of the heading portion (track b') of the CD track b are played (See (a) of FIG. 12) from the HDD, so that the voice data read from the HDD are written in the buffer memory. Then, the reading of the voice data, as the reproduced sound of the head of the track b, from the buffer memory is started subsequently. Thus, the voice data read from the buffer memory are continuously outputted (see (b) of FIG. 12).

During this time, a setup for the search action or the disc changing action is performed. After the setup is performed, the process of reading the voice data from track b of the CD by the pickup unit 2 is commenced (See (c) of FIG. 12). As a result, the voice data read through the pickup unit (2) are written in the buffer memory. However, in this step, the voice data from 10 seconds after the start point in the track b are read and written into the buffer memory (See (e), and (g) of FIG. 12). In particular, if the address of the track b at the tenth second is at $A9$, the voice data at and after the address $A10$ are read and written. Then, the voice data are continuously read out from the buffer memory like the ordinary play (See (d) of FIG. 12).

Finally, as indicated at (e) of FIG. 12, the reproduction can be continuously made without interrupting the play at the time of the search and the disc exchange by the voice data (track a) from the CD, the header voice data (track b') from the HDD, and the voice data (track b) from the CD.

Because the above-mentioned prior art merely shortens a time period during which no sound is heard by the user at the time of a disc search or a disc changing operation, a soundless portion will nevertheless still exist between the songs being reproduced. As a result, the user will still hear an unnatural interruption in music and/or data reproduction, for example.

SUMMARY OF THE INVENTION

Accordingly, the present invention is directed to a reproducing device with a cross-fading operation that substantially obviates one or more of the problems due to limitations and disadvantages of the related art.

The invention has been conceived in view of the background thus far described, and has an objective to provide a reproducing device with a cross fading operation and an internal memory in order to be enabled to effect a continuous and natural reproduction between arbitrary data groups recorded on a recording medium. The instant invention allows cross-fading between data groups from a recording medium by storing into memory a heading portion of a data group from a recording medium that is to be reproduced following the data group currently being reproduced from the recording medium. The cross-fading operation allows, for example, for trailing information of a data group and heading information of another data group stored in the internal storage to be mixed.

Another objective of the present invention is to provide a reproducing device that is able to reproduce audio (voice) data continuously and naturally as a result of the cross-fade operation, so that the data groups, like chapters or songs, are naturally threaded without any interruption, by outputting the heading portion of the next voice data stored in the internal storage, such as the HDD, and the trailing portion of the voice data being reproduced from the recording medium, and by using fading out/in operation.

Additional features and advantages of the present invention will be set forth in the description which follows, and will be apparent from the description, or may be learned by practice of the invention. The objectives and other advantages of the invention will be realized and attained by the structure and process particularly pointed out in the written description and claims hereof as well as the appended drawings.

To achieve these and other advantages and in accordance with the purpose of the present invention, as embodied and broadly described, a reproducing device of the present invention includes a memory configured to store at least heading portions of respective data groups from one or more data groups recorded on a recording medium; a reproducing device configured to read at least the heading portions of one or more of the data groups from the recording medium; and a controller configured to control the memory and the reproducing device, and configured to execute a cross-fading operation, in which a portion of at least one of the data groups being reproduced from the memory are cross-faded with a portion of at least one of the data groups being reproduced from the recording medium by the reproducing device.

In another aspect, the present invention provides a method for continuously outputting data via a reproducing apparatus including storing at least heading portions of respective data groups from one or more data groups recorded on a recording medium into a memory associated with the reproducing apparatus; reproducing at least the heading portions of one or more of the data groups from the recording medium via a reproducing device associated with the reproducing apparatus; and causing a portion of at least one of the data groups stored in the memory to be reproduced from the memory and cross-faded with a portion of at least one of the data groups being reproduced from the recording medium by the reproducing device.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
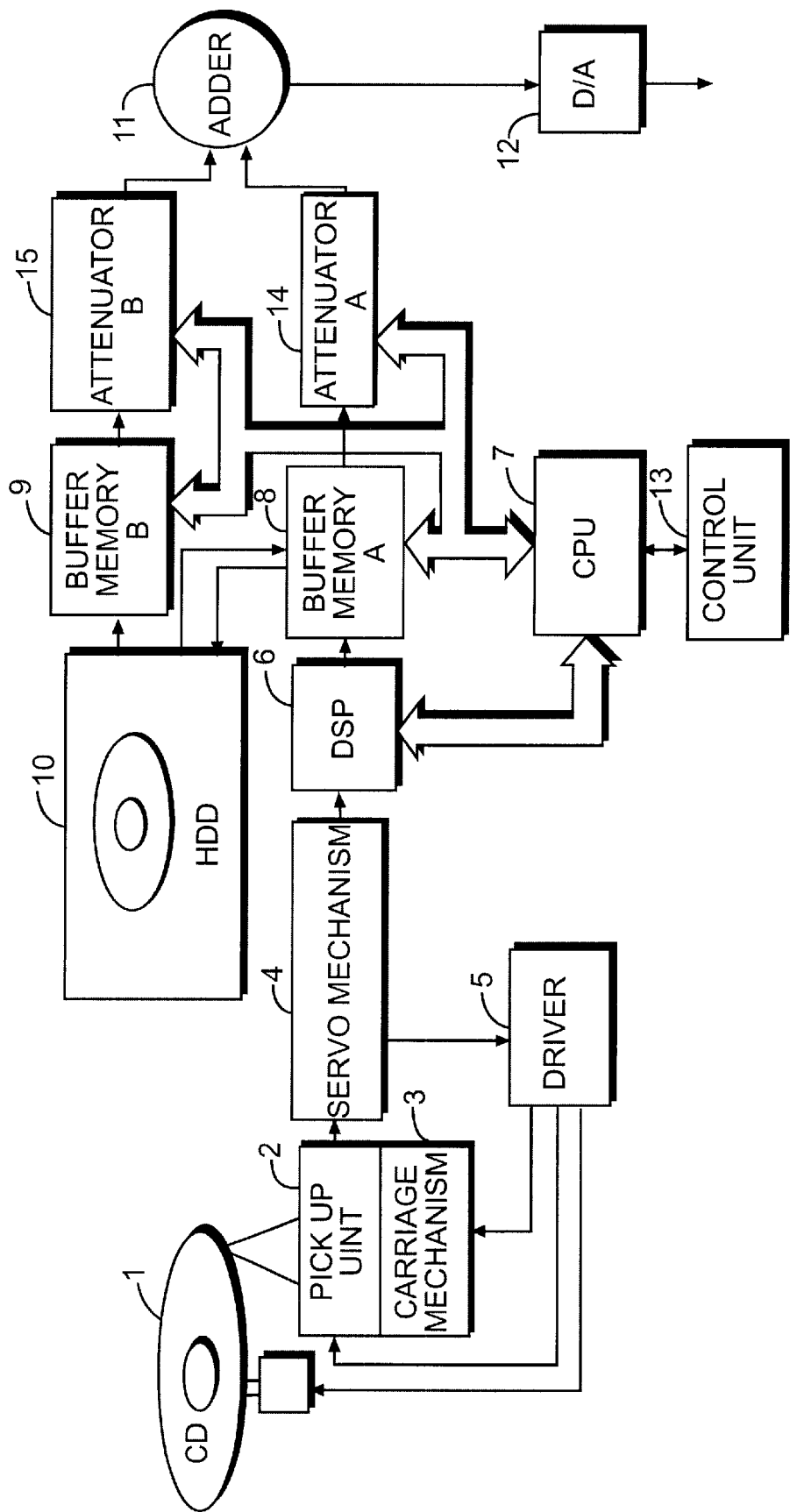
FIG. 1 is a block diagram illustrating a reproducing apparatus in accordance with an embodiment of the invention.

FIG. 1 is a block diagram showing an embodiment of the reproducing apparatus of the present invention. A recording medium 1 is provided, shown, for example, as an optical disk (CD: a compact disk) which is recorded with voice (audio) data, such as a collection of songs, for example. When a disk table is loaded with the CD 1, this CD 1 is rotated at a constant linear velocity or speed (CLV) during a play mode by a spindle motor. The data, as stored in a bit form in the CD 1, are then read out by a pickup unit 2 and fed to an RF amplifier located within the pickup unit 2. In this example, the pickup unit 2 is supported on a carriage mechanism 3 and is driven by a driver 5, which is controlled by a servomechanism 4. The pickup unit 2 includes, for example, an optical system including a laser diode, a polarized beam-splitter and an objective lens; and a detector or the like for detecting a reflected light. The output of the RF amplifier is fed to a digital signal processor (DSP) 6 having a decoder provided therein.

The servomechanism 4 receives a focus error signal and a tracking error signal from the RF amplifier, as well as a spindle error signal from the decoder. Furthermore, the servomechanism 4 generates various servo drive signals for focusing, tracking, threading and spindle operations, thereby to control the driver 5 to execute the various servo actions.

On the other hand, the reproduced RF signal, as obtained by the RF amplifier, is fed to the decoder built in the DSP6 so that the decoder performs EFM (Eight to Fourteen Modulation) demodulation, the CIRC (Cross Interleave Readsolomon Code) decoding, and so on, for example, to decode the information read from the CD 1 into a form of digital voice data, such as music, for example. The digital voice data, as outputted from the decoder, are preferably written in a buffer memory A 8. Under control of a system controller 7, the voice data read from the buffer memory A 8 are fed to a D/A converter 12 via an attenuator A 14 and an adder 11, so that they are fed, as an analog voice signal, to a predetermined voice output portion. For example, the analog voice signal is fed through a volume control circuit and an amplifier to speaker or headphone output terminals so that the voice signal is output to be heard by a user.

Under control of the system controller 7, on the other hand, the voice data, as read from the buffer memory A 8, is also directed to and recorded on a hard disc drive (HDD) 10. By the control of the system controller 7, moreover, the voice data, as read from the HDD 10, are fed through the buffer memory A 8 or buffer memory B 9 via the adder 11 to the D/A converter 12 so that they are directed, as an analog voice signal, to a predetermined voice output portion. For example, the analog voice signal is fed through a volume control circuit and an amplifier to speaker or headphone output terminals so that the voice signal is output to be heard by a user.

The data transfer between the HDD 10 and the buffer memory B 9, the data transfer between the DSP 6 and the buffer memory A 8, and the playing of the CD 1 are controlled by the system controller 7. This system controller 7 is constructed to include a CPU, as a control center, a program memory, a data memory and an input/output port, to control the data transfer between the HDD 10 and the buffer memory B 9 and the data transfer between the DSP 6 and the buffer memory A 8 in accordance with the programs recorded in the program memory. On the other hand, particular functions and features, such as the starting and stopping of the CD playing, the track access, the quick play function, the quick return play or the program play functions, are realized by the system controller 7 for controlling the DSP 6 and the pickup unit 2.

Reference numerals 14 and 15 in FIG. 1 designate attenuators A and B, respectively. The attenuator A 14 is fed with an output signal of the buffer memory A 8, and the attenuator B 15 is fed with an output signal of the buffer memory B 9, so that attenuation and amplifications in both attenuators are controlled by the system controller 7 (described later in more detail).

A control unit 13 is provided with an LCD display and various control keys. These control keys are assigned for the user to effectuate various control features, via, for example, a play key, a track access key, and a stop key. The control unit 13 is further provided with a key for making CD selections to play one or more of a plurality of CDs. The control unit also includes control keys for programming an order of reproduction, or for selecting a random play mode. In the LCD display, there are displayed a variety of information to be processed by the system controller in association with those keys. The control unit 13 is a portion for realizing the man-machine interface.

Heading Data Recording Method for Ordinary Play

Figure 2:
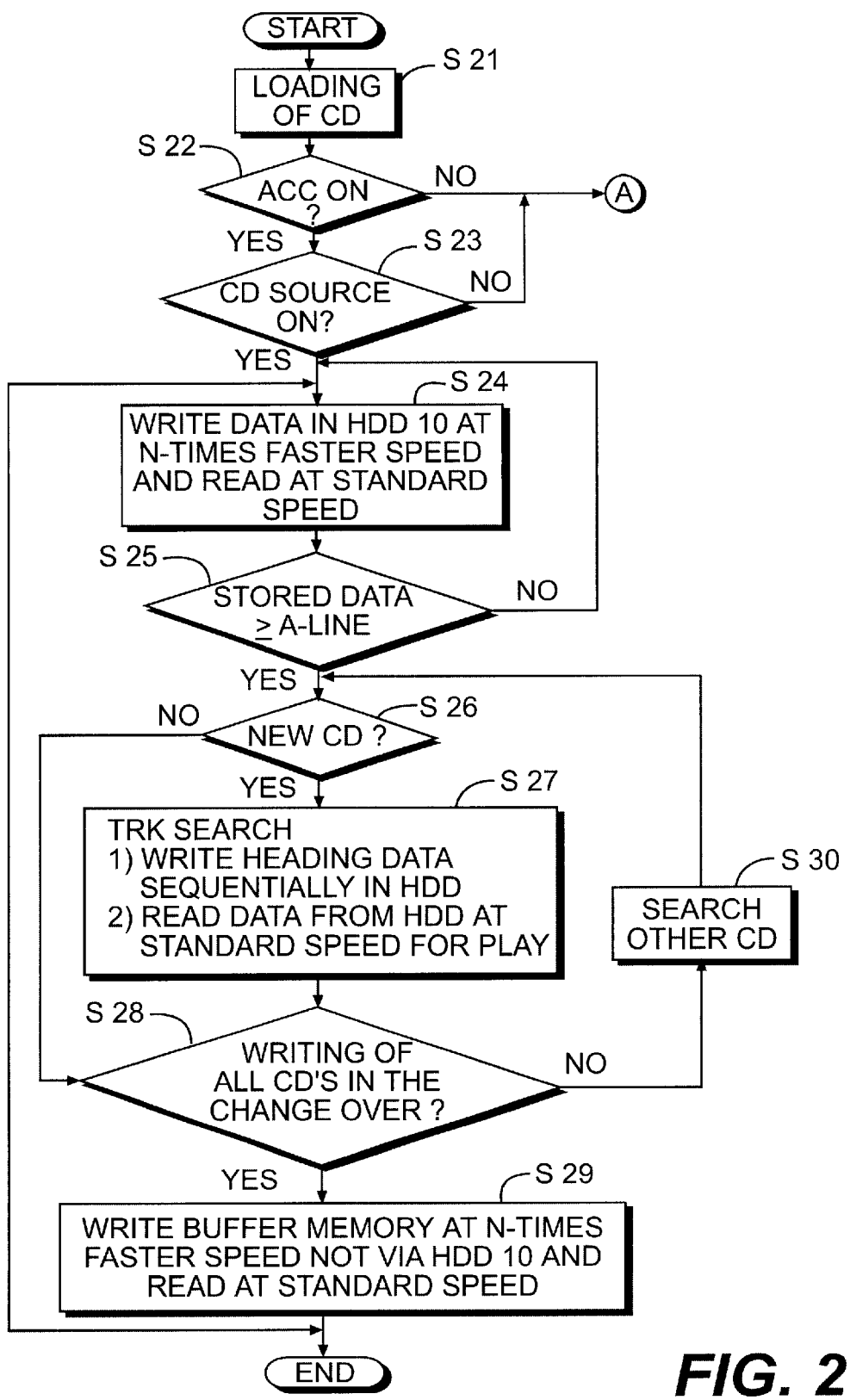
FIG. 2 is a flow chart illustrating the process of an embodiment of the invention during an ordinary play mode.
Figure 3:
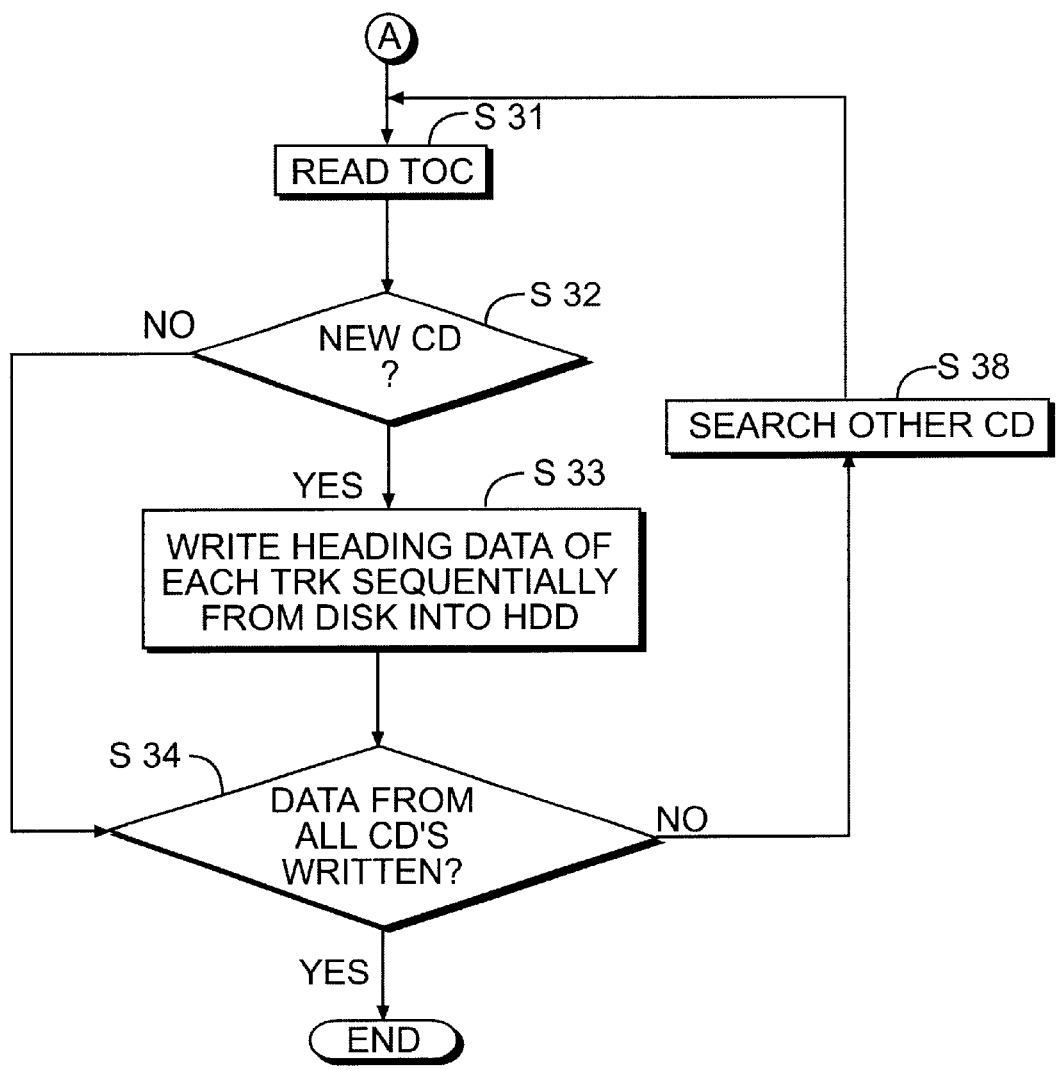
FIG. 3 is a flow chart illustrating the process of an embodiment of the invention during an ordinary play mode.
Figure 4:
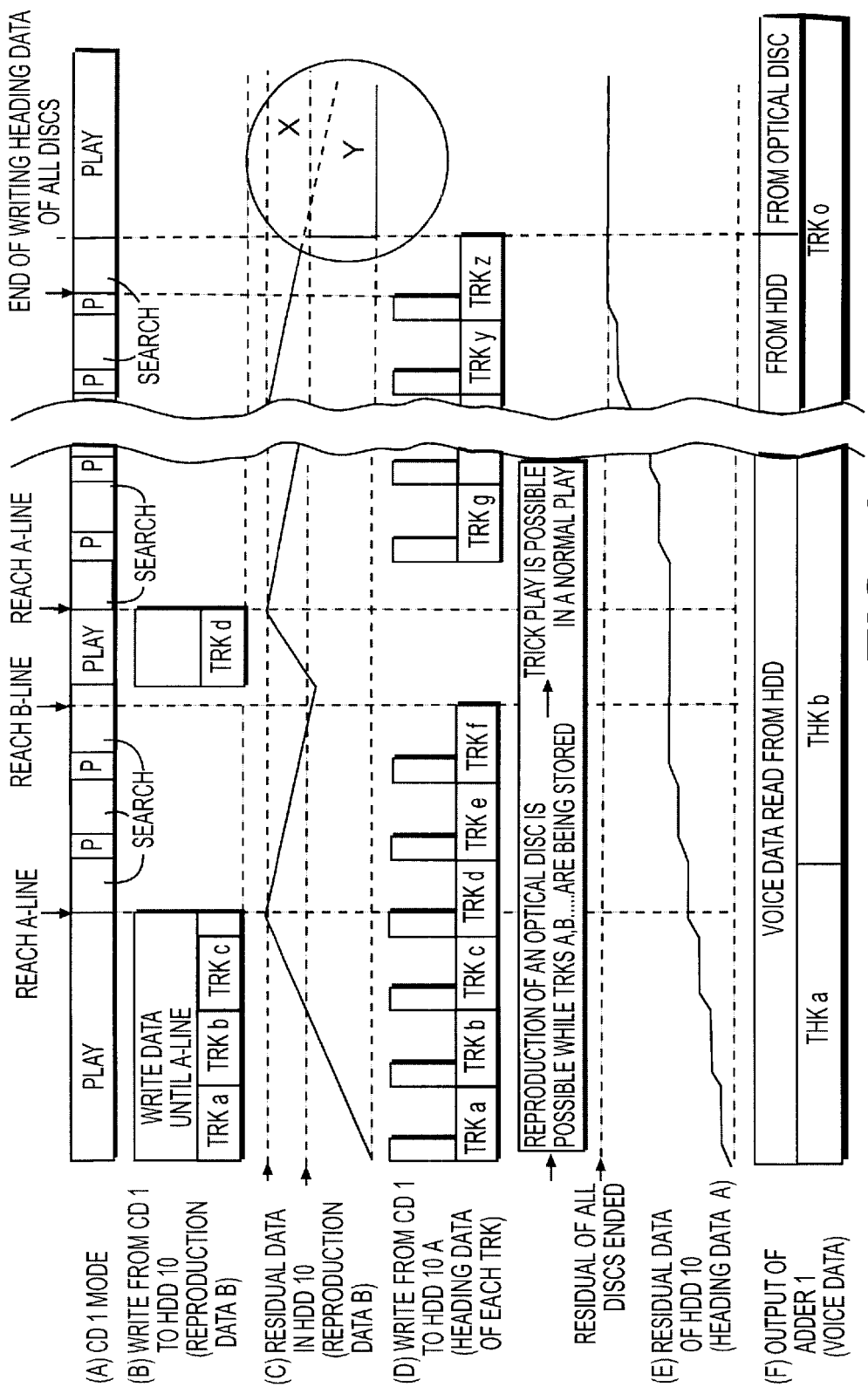
FIG. 4 is a timing chart illustrating an embodiment of the invention during an ordinary play mode.
Figure 7:
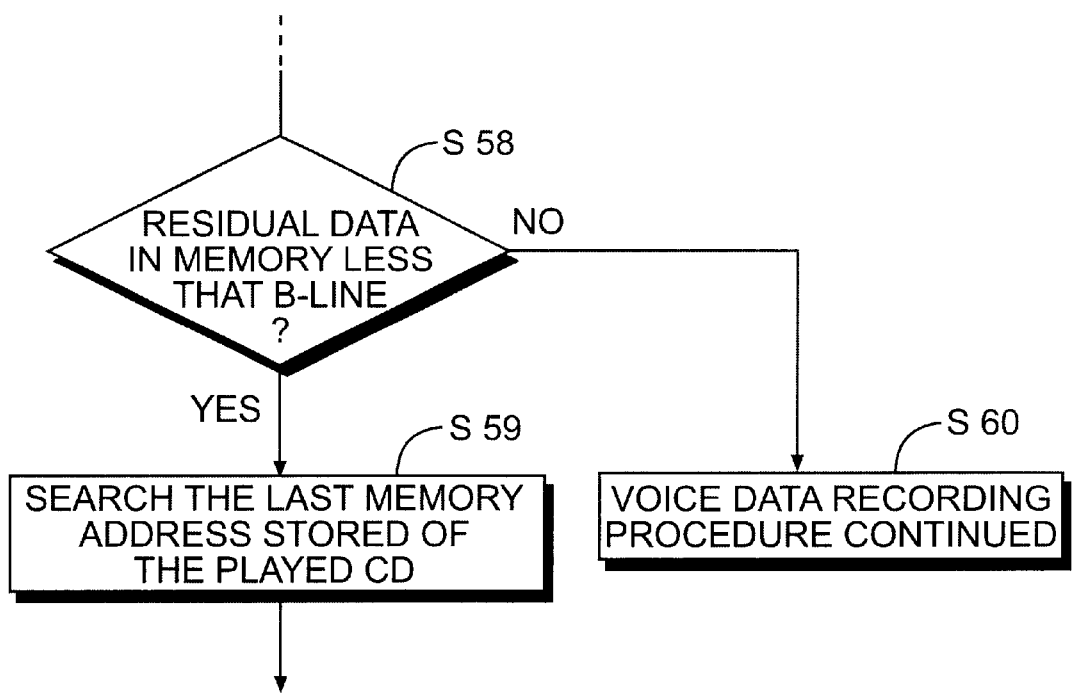
FIG. 7 is a flow chart illustrating the process of an embodiment of the invention utilized in each of the ordinary play and in the trick play modes.

FIGS. 2 to 4, and FIG. 7 are charts which are presented for explaining the process and actions performed by the structure of the embodiment shown in FIG. 1 of the invention. FIGS. 2, 3, and 7 are flow charts and FIG. 4 is a timing chart of the processing procedure of the system controller 7 for the ordinary play mode of an embodiment of the present invention. In this example, a magazine type of CD changer is described, as an example of a record/play device that may be used for realizing the invention. However, the instant invention is not limited to a CD changer environment.

The actions and process performed by the embodiment shown in FIG. 1 will now be explained in detail with reference to FIGS. 2 to 4 and FIG. 7. Specifically, the flow charts shown in FIGS. 2, 3 and 7, are programmed and stored in the program memory that is provided within the system controller 7 of FIG. 1.

As shown in FIG. 2, the CD1 is loaded to a clamp position (Step S21), so that it is prepared for the ordinary play. Next, the system controller 7 verifies (Steps S22 and S23) whether or not the accessory power source is "ON", and whether or not the CD source is "ON". Confirming that both are "ON", the system controller 7 starts to play the CD 1. Here, voice data of the CD 1 are written into the HDD 10 while the CD changer is playing the CD 1. Specifically, the playing function is performed (Step S24) by reading the voice data of the CD 1 at an N-times faster speed than a standard (normal) reproduction speed (N>1). This read voice data is then written, via the buffer memory, A 8, into the HDD 10. The written voice data is fed from the HDD 10, at the N-times speed, to the buffer memory A 8. The voice data is then read at the standard speed from the buffer memory A 8. Here, the data from the CD 1 to be written into the HDD 10 are the voice data to be reproduced by the pickup unit 2 and its corresponding address and header data. Here, the voice data and the corresponding address/header data reproduced by the pickup unit 2 are sequentially recorded in the HDD 10. All of this data that has been recorded in the HDD 10 may be left in the HDD 10, even after the voice data has been read out at the standard speed from the buffer memory A 8. Alternatively, only the heading data (for example, the heading voice data and its corresponding address data) may be exclusively left in the HDD 10. Any recording method may be adopted for this purpose, as long as at least the heading data are recorded and stored in the HDD10.

In Step S25 of FIG. 2, a verification is made of whether or not the voice data stored in the HDD 10 is more than a constant predetermined quantity. This is referred to as an A-line check. Because the HDD 10 can record only a predetermined quantity of voice data, this A-line check is preferably performed. The A-line check is described with reference to the time chart shown in FIG. 4. When the voice data stored in the HDD 10 is more than a constant quantity, the aforementioned reading at the N-times speed from the CD 1 is temporarily interrupted.

After this temporary interruption, a verification is made as to (Step S26) whether or not the CD 1 being played is a CD that is being loaded for the first time in the CD player. If it is determined at Step S26 that the particular CD 1 was previously loaded in the player (or magazine, for example) the flow will move to the "NO" direction in FIG. 2. In this case, it is determined that the heading data of this particular CD 1 has already been recorded in the HDD10 when it was previously loaded in the player. To check this, there are various measures that may be taken. For example, whether or not a CD is a "new CD" that has not previously been loaded into the CD player may be verified by checking the flag of an absolute time (or the total reproduction time) of the CD. It may also be verified by examining an ID that is intrinsic to each CD 1. The reason of adopting this step is to avoid duplication of the heading data in the HDD 10. In particular, the writing of heading data from a CD is omitted when a CD is loaded subsequent to its first loading in the player, because the heading data for that particular CD had already been recorded in the HDD when the CD 1 was loaded for the first time in that player.

If a determination is made in Step 26 that the current CD 1 is a new CD to this player, a track adjacent to one that has previously been recorded in the HDD 10 is searched, and the data (or the heading data for a predetermined time) are sequentially written in the HDD 10. This procedure takes place while the playing function is continuously performed by reading data from the HDD 10 sequentially at the standard speed (Step S27). Here, timing chart for playing and writing are described with reference to FIG. 4. It is noted that the types of data that are written into the HDD 10 include the voice data of each track (i.e., the audio or song, for example), the disk ID, the disk absolute time, and the address data corresponding to the recording data.

In a situation where a CD has previously been loaded into the player (the heading data of which have been already recorded in the HDD 10), writing in the HDD10 is omitted when it is re-loaded, by checking the absolute time (as a flag, for example) stored in the HDD 10. In a CD changer embodiment utilizing the present invention, it is moreover checked (Step S28) whether or not data of all the CDs in the magazine have been written. Depending upon this result, the routine enters either a search for another CD in the changer (Step S30) or will enter an ordinary CD play mode (Step S29). Here, the data-reading-speed in the ordinary play may not be at the N-times speed.

In steps S22 and S23 of FIG. 2, either (1) when the ACC is not "ON," or (2) the CD source is not "ON," for example, when the engine is not activated or when a source other than the CD source, like the tuner or tape, is selected but the CD 1 has been already loaded, the writing of the heading data is nevertheless performed without playing the CD 1. In this case, the TOC (Table Of Contents) of the loaded CD 1 is read (Step S31 in FIG. 3), and a verification is made (Step S32) of whether or not the CD 1 is new to this player. If it is determined that the CD 1 is new to this player, the writing into the HDD 10 of the heading data for a predetermined duration of each track of the CD 1 commences (Step S33). The heading data is sequentially written from the CD 1 into the HDD 10. Then, a verification is made as to (Step S34) whether or not data of all the CD's in the magazine (in a CD changer embodiment) has been written into the HDD 10. Depending on the result of this check, either a search for another CD 1 commences (Step S38), or the heading data recording procedure is ended. As a result of this process, the heading data for each of the CDs in the magazine are automatically recorded in the HDD10, even during the accessory power off (ACC OFF) state or when a source other than the CD source is currently being activated.

At some point between Steps S26 and S28 of FIG. 2, a verification is preferably made as to (Step S58 in FIG. 7) whether or not residual data in the memory (HDD 10) is less than a predetermined constant level. This verification is referred to as a B-line check and is illustrated in the flow chart of FIG. 7, and described with reference to the timing chart shown in FIG. 4. If the residual data in memory (HDD 10) is less than the B-line level, the stored final memory address of the played CD 1 is searched (at Step S59 of FIG. 7). Then the routine, at and after Step S24, in order to write data into the HDD10 at the N-times faster than the standard reproduction speed, and to read data from the buffer memory A 8 at the standard reproduction is repeated. If the residual data in memory (HDD 10) is more than this B-line level, the voice data recording procedure is continued to the HDD10 while the ordinary play is executed (Step S60).

In the flow chart in FIG. 2, on the other hand, the judgment whether or not a disk is new is executed when the predetermined quantity (A-Line) of data are stored in the HDD 10. However, this determination could also be made during the time of Step S24 as well.

FIG. 4 illustrates a timing chart describing the method of recording the heading data corresponding to tracks on a CD 1 while the CD 1 is being played in the ordinary play mode. Each of the heading data corresponds to data of a predetermined time period from the head of its corresponding track. Sections (a) to (f) of FIG. 4 indicate, in order, the reproduction mode of the CD (play/search), the data writing procedure of reproduction data (b) (for the normal reproduction mode) from the CD 1 into the HDD 10, the level of residual data (of the reproduction data b) in the HDD 10; the data writing procedure of the heading-data a (of each track) from the CD 1 into the HDD 10; the level of residual data (of the heading data a of each track) in the HDD 10; and the output information of the adder 11.

Here, the letter "a" represents the heading data of each track from the CD 1 stored in the HDD 10. The letter "b" represents the reproduction data for the normal reproduction mode stored in the HDD 10. These different types of data are separately described to aid in the description of which type of data (either all of the voice or audio data corresponding to a track on the CD 1, or only the heading data of each track on the CD 1) are written into the HDD10.

The chart indicates that the CD1 can be played while recording the heading data of each track (a to z) sequentially by repeating the play mode (P) and the search mode (Search). Here, the memory is provided with the aforementioned A line check because no more than the predetermined number of data can be recorded in the HDD10.

Specifically, the playing function commences from a first music track (track a) of CD1, and the voice data of the track a (TRK a), the voice data of the track b (TRK b), and the voice data of the track c (TRK c) are sequentially recorded at the N-times faster speed into the HDD10, so that the quantity of data in the HDD10 gradually increases (as referred to by portion (c) of FIG. 4). Simultaneously with this procedure, the voice data of the track a is read at the N-times faster speed from the HDD10 and it is fed into the buffer memory A 8. This voice data is read at the normal speed from the buffer memory A 8, and is reproduced at the normal speed through the attenuator A 14 and the adder 11.

When the recording capacity of the HDD 10 reaches the predetermined A-line quantity during the aforementioned action, the reading from the pickup unit 2 is temporarily interrupted. However, the ordinary playing function is continued, as apparent to the user listening to the CD playback, because of the data being output from the HDD 10. As a result, the residual data in the HDD 10 is gradually reduced during this time (as referred to (c) of FIG. 4). In this example, the A-line level is reached while the fourth music (track d) is being recorded, and reading from the pickup unit 2 is temporarily interrupted. At this time, the first music (track a) is normally played, and the heading data are recorded up to heading data of the fourth track on the CD 1.

While the ordinary playing function proceeds, the residual data in the HDD10 decreases and the action to fetch only the heading data of the next and later tracks (TRK e and later) from the CD 1 commences. Because the actual voice data of three music tracks have been fetched already and stored in the HDD 10 in this example, the voice data of the fourth and subsequent music tracks need not be fetched for the time being. As a result, it is permitted that the heading data alone, without corresponding voice data, be exclusively fetched from the CD 1. Therefore, the fifth music track (track e) is searched, and only its corresponding heading data is stored into the HDD10. Subsequently, the sixth music track (track f) is searched so that only its heading data is fetched from the CD 1 and recorded into the HDD 10 as well. In the example illustrated in FIG. 4, because the quantity of data stored in the HDD 10 reaches the B-line level at this time, the action to fetch the entire voice data (instead of only the heading/address data) of the fourth music track is started again. Thus, above-mentioned actions are repeated.

Here, there are two options after the heading data of all tracks of the CDs in the magazine have been written. In one case, as indicated by a broken line X, the reproduction is continued by using the voice data stored in the HDD 10. In the other case, as indicated by a solid line Y, the voice data stored in the HDD10 are not used, but the voice data from the pickup 2 is used by selecting an output signal from the pickup unit 2. The former case is advantageous as a result of its high resistance to disturbances resulting from physical advantages of the HDD 10 itself, whereas the latter case is also advantageous in that the use of the CD player results in reduced power consumption.

Thus, by performing the playing function at the N-times faster speed, the heading data of individual tracks from the CD 1 can be recorded in the HDD 10 at the same time that the ordinary CD 1 playing function is performed. In the HDD 10, as shown at portion (e) of FIG. 4, the heading data of individual tracks are gradually stored.

Heading Data Recording Method for Shuffle or Scan Playing Modes

Figure 5:
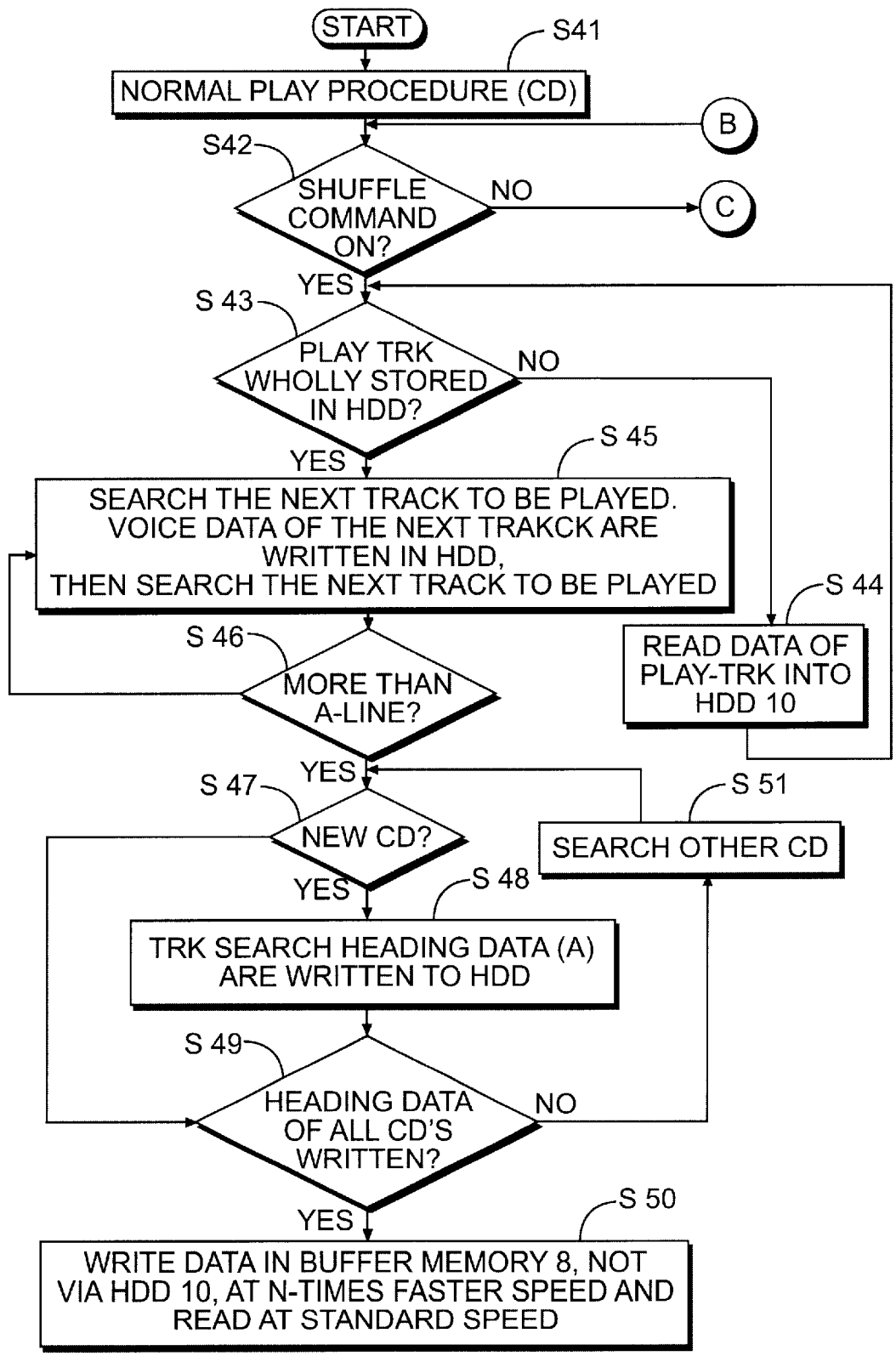
FIG. 5 is a flow chart illustrating the process of an embodiment of the invention during a trick play mode.
Figure 6:
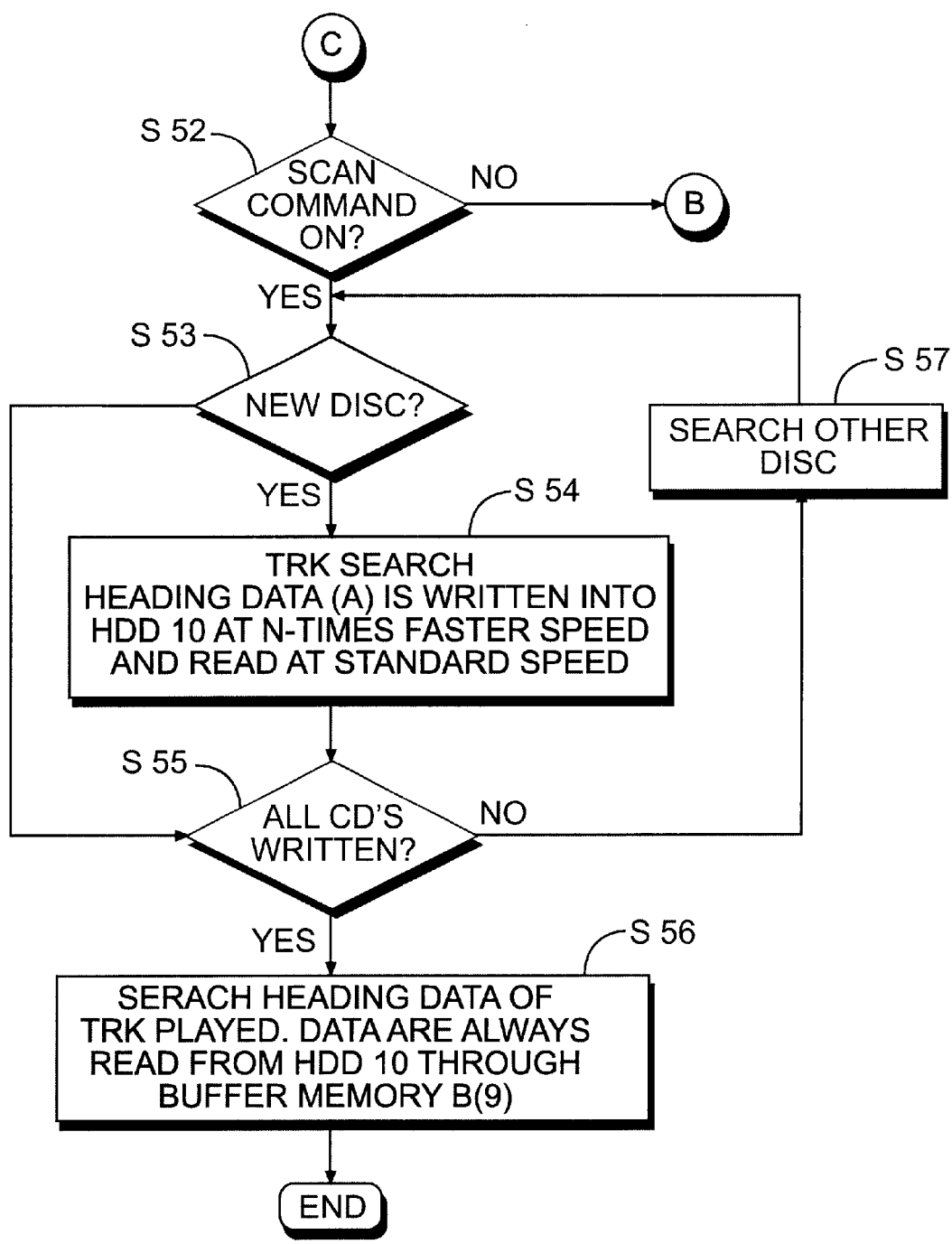
FIG. 6 is a flow chart illustrating the process of an embodiment of the invention during a trick play mode.
Figure 8:
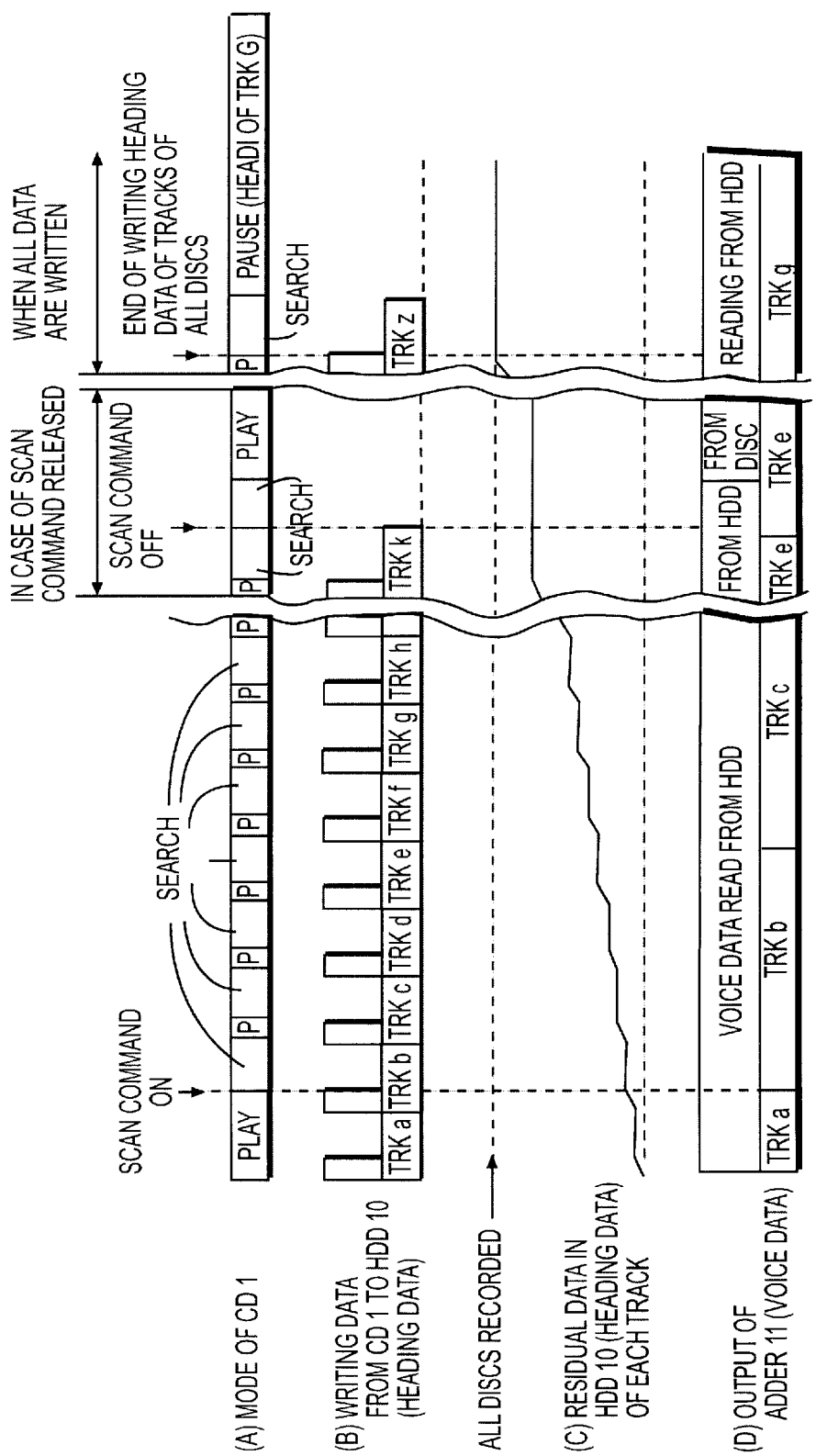
FIG. 8 is a timing chart illustrating the trick play embodiment of the invention.

FIGS. 5 to 8 are charts for explaining a method for recording heading data during a shuffle or a scan playing mode (trick playing modes) utilizing the arrangement of the invention shown in FIG. 1. FIGS. 5–7 are flow charts and FIG. 8 is a timing chart describing the processing procedure of the system controller 7 during a trick playing mode, such as the shuffle or scan commands. In the timing chart shown in FIG. 8, sections (a) to (d) indicate, in order: the reproduction mode of the CD 1, the data writing procedure of the heading-data a (of each track) from the CD 1 into the HDD 10, the level of residual data (of the heading data a of each track) in the HDD 10; and the output information of the adder 11. Here, a timing chart for the shuffle play mode is omitted because it is substantially similar to that of the ordinary play mode. Thus, hereinafter a timing chart only for the scanning action will be described.

With reference to FIGS. 5 to 8, actions relating to a trick play mode (for example, a shuffle mode or scan playing mode) by the apparatus shown in FIG. 1 are described in detail. The shuffle mode indicates, for example, a Programmed Play or the Random Play mode, in terms of CD player technology. The scan playing mode indicates, for example, a functionality in which only the heading portion of each track on a CD in the player (or various CDs in a changer) are played continuously.

In the normal play procedure (Step S41 of FIG. 5), for example, as described with regard to FIGS. 2 and 3, the shuffling action, such as the Programmed Play or the Random Play, may be instructed (Step S42 of FIG. 5) by the user. If so, a verification is made (Step S43) as to whether or not data of the track being played from the CD 1 (play-TRK) has already been wholly recorded in the HDD 10. If the play track has not previously been wholly recorded in the HDD 10, its voice (music) data is read, at the N-times faster speed, from the CD 1, and is written in the HDD 10 (Step S44). After this, the play track is played (Step S44) by feeding the voice data written in the HDD, at the N-times faster speed, to the buffer memory A 8, and by reading it, at the standard speed, from the buffer memory A 8. When the play track is recorded in the HDD 10, on the other hand, the next play track from the CD 1 to be played in the shuffle mode is searched, and the voice data of this searched track is written in the HDD 10. Then, the third play-track is searched (Step S45) as well. Here, the heading data to be written into the HDD 10 includes the voice (audio) data as well as the corresponding address data.

Next, a verification is made (Step S46) as to whether or not the voice data quantity recorded in the HDD 10 has reached more than a constant predetermined level (A-line). The A-line level is checked in this way because the capacity of the HDD 10 only allows a predetermined amount of voice data to be recorded in the HDD 10. When the voice data already recorded in the HDD 10 surpass the A-line level, a verification is preferably made (Step S47) as to whether or not the played CD 1 is a new CD that has not previously been played in this player before. If it is a new CD, the track search of the CD 1 is performed and the heading data corresponding to a predetermined time duration for each track on the CD 1 are sequentially written in the HDD 10 (Step S48). In this operation, the data to be written into the HDD 10 include the disk ID, the disk absolute time, the voice (audio) data of the heading portion corresponding to the predetermined time period of each track, and the address data corresponding to the recorded data. In a shuffling mode arrangement, only the programmed music is read, at the N-times faster speed, and its heading data are recorded. In case of an "old CD" that has previously been loaded in a particular player (the heading data of which have already been recorded in the HDD 10), because the absolute time of the CD 1 is stored as a flag, for example, in the HDD 10, the writing procedure in the HDD 10 can be omitted for that particular CD 1 when it is loaded a subsequent time into that player.

In a CD changer arrangement, it is moreover checked (Step S49) whether or not the heading data of all the CDs in the changer have been written. Depending upon the result of this determination, the flow will be directed to either search of another CD 1 in the changer (Step S51) or to execute the CD playing function (Step S50). Here, data is written into the buffer memory A 8 at the N-times faster reproduction and not through the HDD 10. The buffer memory A 8 will then output the data at the standard speed.

On the other hand, when the scan command is ON (Step S52 in FIG. 6), a verification is made (Step S53) as to whether or not the played CD 1 is a new CD that has not previously been loaded into the CD player. In the case of the new CD, a track search is performed that writes the heading voice data sequentially at the N-times faster speed into the HDD 10 and reads data stored in the buffer memory A 8 at the standard speed (Step S54). Here, the data to be written in the HDD 10 are the same data as the voice (audio) data to be reproduced by the pickup unit 2 and its corresponding address data. Next, a verification is made (Step S55) as to whether or not data of all the CDs (in a changer embodiment) have been written into the HDD 10. Depending upon this result, either the search for another CD in the changer will commence (Step S57) or the playing of the CD 1 (Step S56) will be executed. In the CD reproduction step (S56), the heading data of each track to be played is searched, and the data are always read from the HDD 10 through the buffer memory B 9.

Here, if a scan-release command is received while the scan command is being processed, as shown in the timing chart of FIG. 8, the played track is played again from the head on the basis of the data which are read from the HDD 10 through the buffer memory B 9. While this is occurring, a search for the currently played track of the CD 1 is made.

Preferably, during the flow of Steps S47 to S49 of FIG. 5, a verification is made (Step S58 of FIG. 7) as to whether or not the residual data in the HDD 10 is less than a predetermined constant (B-line) level. If it is less than the B-line level, the stored final memory address of the played CD 1 is searched (Step S59). Otherwise, the voice (audio) data writing procedure for the HDD 10, in the aforementioned trick play mode, is continuously executed (Step S60).

As described above, the heading voice data of each music track in the CD 1, for example, are recorded in the HDD 10 at the same time that the normal play mode or the trick play mode is operating.

It is noted that while particular embodiments described above have been discussed with regard to an arrangement in which the heading voice data of each track in the CD 1 is recorded into the HDD 10, it is also possible to record only the heading voice data of each CD as a whole into the HDD 10. The invention is not limited to CD recording media, but can also be applied to other recording media, such as the minidisc forma (MD) or the digital versatile disc format (DVD).

The application of the instant invention can also be extended from the voice data arrangements described above to other suitable data, such as video data or character data. In this application, the heading data may be recorded in terms of a predetermined group in the HDD10. The term group may include such designations as a chapter or a title, for example.

Furthermore, in the above-described embodiments, the HDD 10 is mounted within the reproduction apparatus. However, other internal storage arrangements could alternatively be used, as long as the arrangement has a capacity to record the heading data.

Cross-Fading Operation

The procedures of a cross-fading operation feature of the instant invention will now be explained that utilizes the aforementioned heading data.

Figure 9:
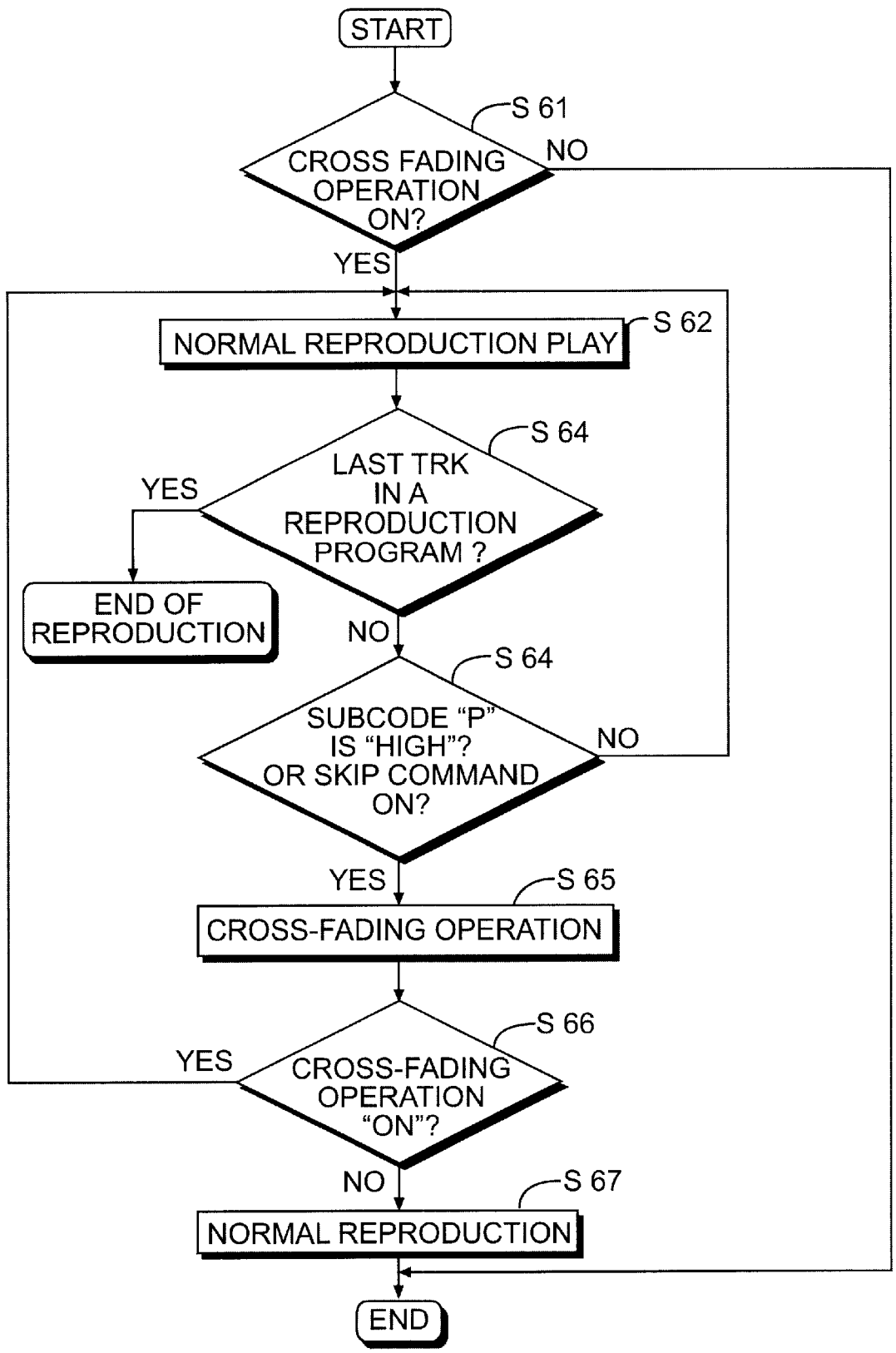
FIG. 9 is a flow chart illustrating the process of a cross-fading embodiment of the invention.
Figure 10:
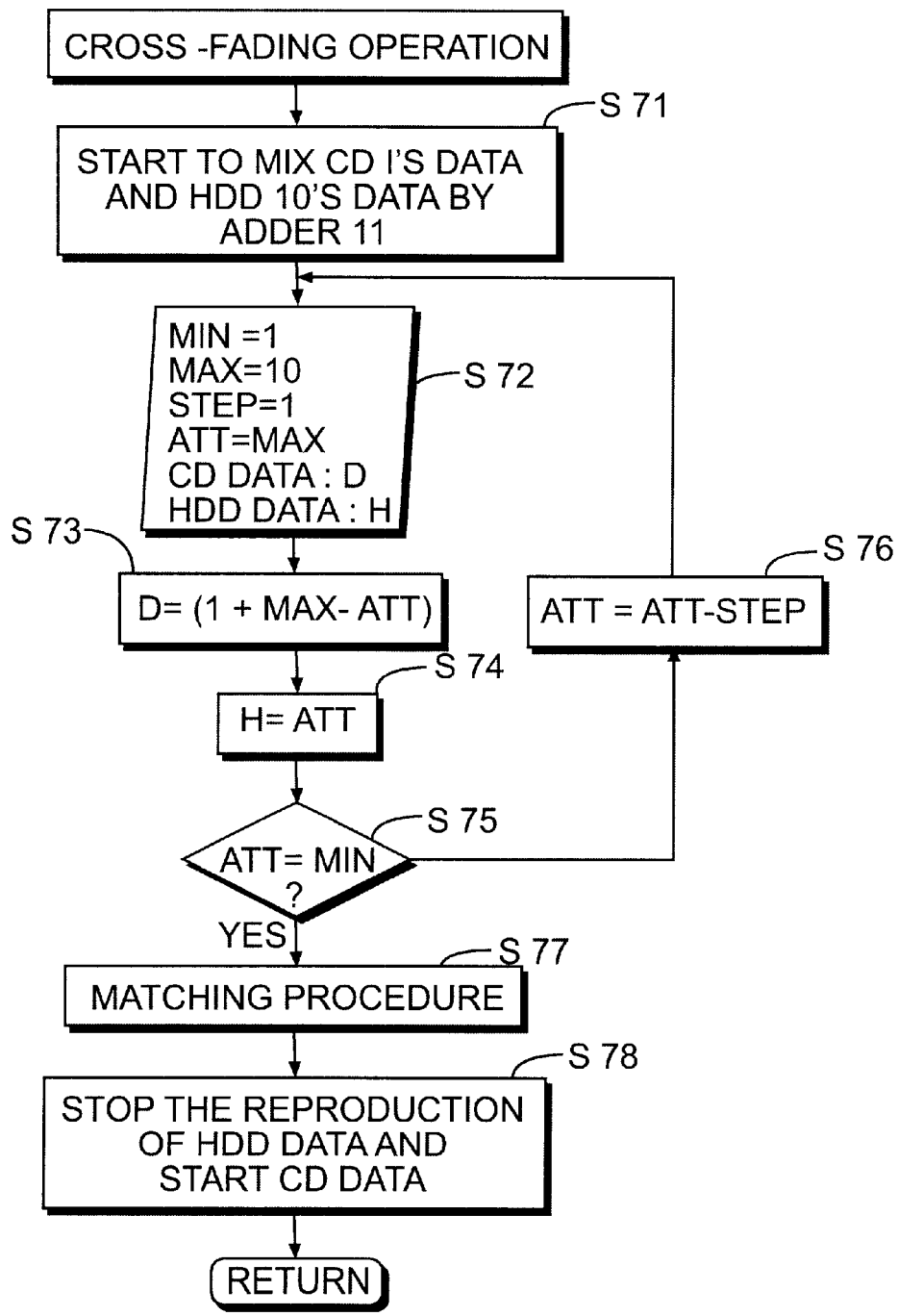
FIG. 10 is a flow chart illustrating the process of the cross-fading embodiment of FIG. 9.
Figure 11:
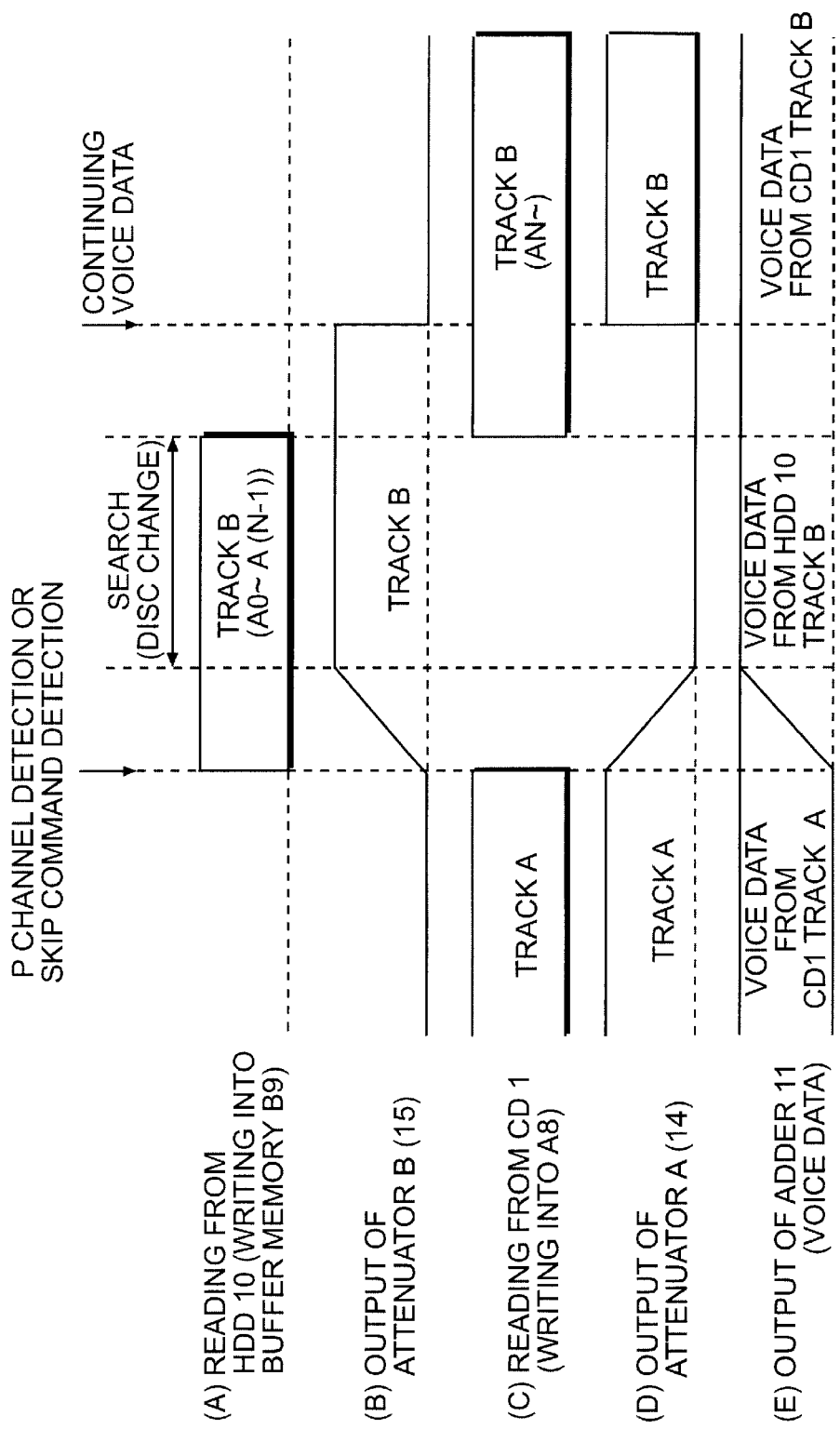
FIG. 11 is a timing chart illustrating an embodiment of the invention.
Figure 12:
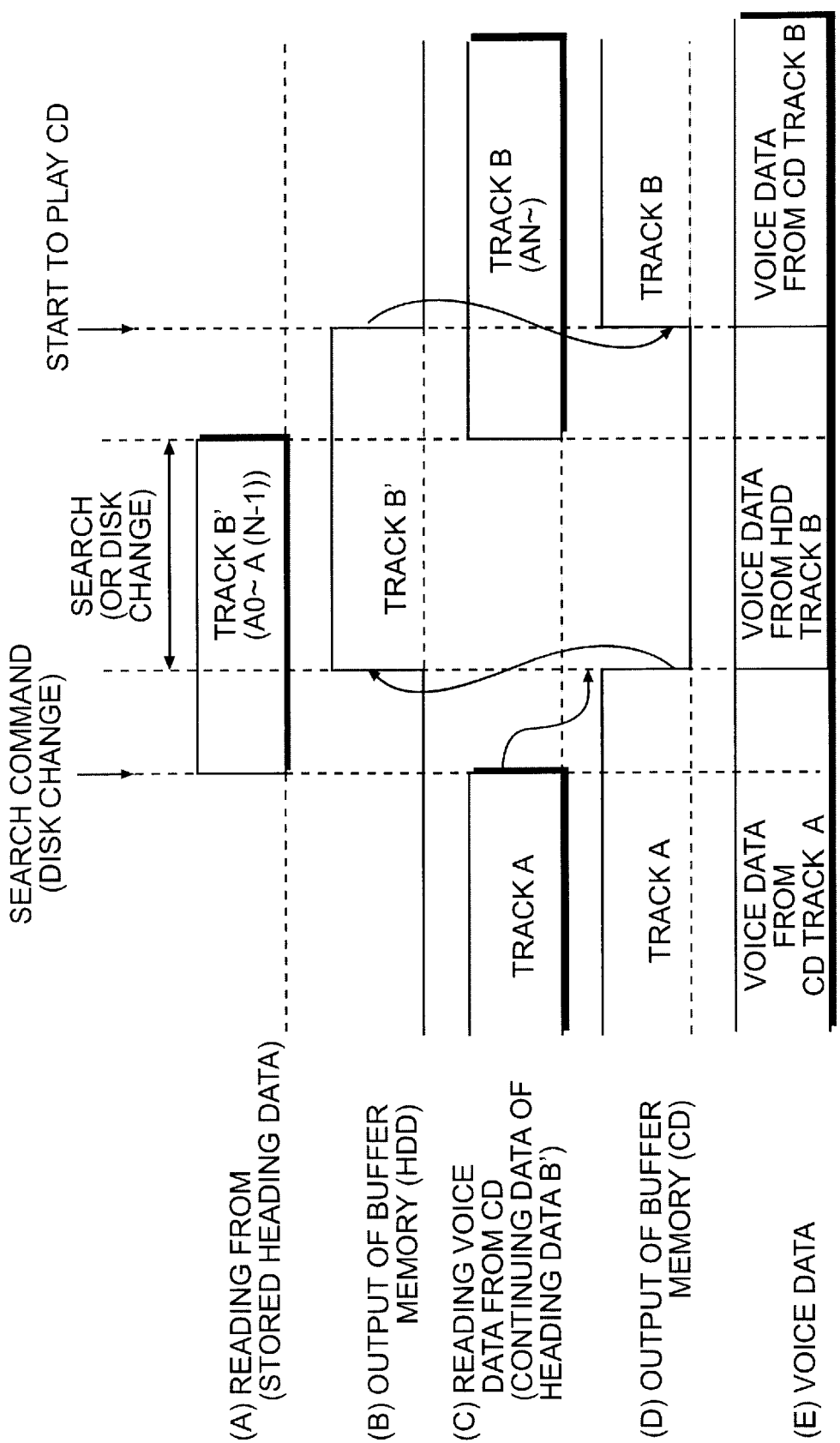
FIG. 12 is a timing chart illustrating a process performed by a recording device of the prior art.

FIGS. 9 to 11 are charts, which are presented for illustrating and explaining a cross-fading reproduction feature that utilizes the heading data recorded in the HDD 10 of the FIG. 1 arrangement efficiently. The flow charts of FIGS. 9 and 10 and the timing chart of FIG. 11 illustrate a main-routine and corresponding sub-routines for the cross-fading operation corresponding to either a normal play mode or a skip mode, as selected by the user.

With reference to FIGS. 9 and 10, procedures implemented by the apparatus shown in FIG. 1 are described in detail. This cross-fading embodiment may be implemented in at least two different ways. First, the cross-fading feature may be implemented after the heading data has already been recorded in the HDD 10. Secondly, the cross-fading reproduction feature may also implemented at the same time that the heading data are being recorded in the HDD 10.

The arrangement in which the heading data has already been recorded in the HDD 10 will first be described. In this arrangement, the system controller 7 checks (Step S61 in FIG. 9) whether or not the user has set the cross-fading operation mode. When the cross-fading mode has been set, the normal reproduction play is done (Step S62), and a verification is made (Step S63) as to whether or not a music track, for example, being reproduced is the last track in a reproduction program. If it is the last track in a reproduction program, the reproduction procedure is ended.

When it is not the last track in a reproduction program, the system controller 7 monitors the voice (audio) data fed to the DSP 6 to detect a the proper timing to commence a fade-out or fade-in operation. For example, a state of the "P-channel" data in the sub-code information included in the voice data (Step S64) is continuously monitored, so that the end of the music track being played, or the head of the next music track (program), or an interval between the music track being played and the next track (program) to be played, for example, is detected. Here, the sub-code P includes data indicating the interval (intermission), as a "HIGH" level signal. In other words, a "LOW" level signal of the sub-code P indicates a state of still being within a track, according to the CD sub-code format. In short, an interval between tracks can be detected by monitoring the sub-code P.

When the sub-code P shows "LOW", the normal play (Step S62) is continued to detect the interval because the music is being played.

When the sub-code P becomes "HIGH", a cross-fading sub-routine (Step S65) commences in accordance with the flow chart illustrated in FIG. 10, for example.

Depending upon the result of the above-mentioned P-channel check, the control of attenuators A, B (14, 15) will commence to determine the timing of the cross-fading operation.

In Step S66 of FIG. 9 a determination will be made again as to whether or not the cross-fading operation mode is still ON. This recheck is implemented in order to determine whether or not the cross-fading operation mode has been released after its initial implementation. If the cross-fading operation is still "ON", the main-routine of FIG. 9 will return to the normal play mode of Step S62 to repeat the actions described above. If the cross-fading operation is no longer "ON" at the determination of Step S66 of FIG. 9, this is an indication that the cross-fading processing was released midway. As a result, the cross-fading feature is no longer implemented and the normal reproduction mode is executed (Step S67).

It is noted that Step S64 of FIG. 9 contemplates not only track interval detection, but also the detection of the activation of a skip command (or a search command) by the user. Detection of such occurrences will cause the system controller 7 to start the cross-fading processing routine, described in more detail below, on the basis of receiving a command indicating such a detection.

For the detection of the interval of music tracks in a CD, for example, as described above, the P-channel code in the sub-code is employed. In the case of another type of recording medium, however, there may be suitably used information capable of detecting the interval of music tracks. To detect the head or tail of music, on the other hand, there may also be suitably used information capable of detecting the head or tail of music or a data track. The starting absolute timing data of each track may be utilized, for example.

The cross-fading sub-routine will now be further described, with reference to FIG. 10. When the cross-fading sub-routine is implemented, output signals from both the CD 1 and the HDD 10 are mixed (Step S71 of FIG. 10) by the adder 11. Specifically, the voice (audio) data of the music track being played from the CD 1 are fed to the adder 11 through the buffer memory A 8 and the attenuator 14. The voice (audio) data of the next music track, on the other hand, are fed to the adder 11 through the buffer memory B 9 and the attenuator. As a result, the voice data output from the CD 1 and the HDD 10 are mixed in the adder 11. In order to determine the attenuation or amplification level of each of the attenuators A, B (14, 15), a variable ATT (showing attenuation levels) is set with ten steps of level values divided from a minimum value of "1" to a maximum value of "10". The step-width is (+1). Here, initial conditions may preferably be set to an attenuation level data of CD 1 of D, an attenuation level data of the HDD 10 of H, an initial value of the variable ATT of "10"(the maximum value), as indicated at Step S72 of FIG. 10. Then, at Step S73, the attenuation level data of the CD 1 is preferably calculated by the equation D=1+max−ATT. On the other hand, the variable ATT (at this time, ATT=10) is set, as the attenuation level data H (Step S74). Then, the calculation of "variable ATT−Step" (Step S76) is repeated until the variable ATT reaches the minimum value "1" (Step S75). As a result, the attenuation level data D of the CD 1, and H of the HDD 10 are gradually moved up and down, respectively.

Accordingly, by using the above-mentioned data changing gradually, the tailing portion of the music track being played and the heading portion of another music track (for example, the next music track to be played) are cross-faded. An output signal is then output from speakers through the D/A converter 12 so that it can be heard by the user.

Because what is recorded in the HDD 10 is the voice (audio) data of only the heading portion of the next music track, output signals from the HDD 10 and the CD 1 should be time synchronized (Step S77 of FIG. 10) to avoid interruption and to allow a continuous reproduction of a particular track. By matching the trailing portion of the voice data in the HDD 10 and the start address of the CD 1, the next music track is successively reproduced even after the voice data stored in the HDD 10 for the cross-fading operation has been output. Accordingly, based on the start address, the data of the CD 1 will then be used instead of data stored in the HDD 10 (at Step S78).

FIG. 11 is a diagram illustrating the cross-fading actions of an embodiment of the instant invention on a timing chart. Portions (a) to (e) of FIG. 11 indicate, in order: the reading process from the HDD 10 (or the writing process into the buffer memory B 9); an output signal of the attenuator B15; the reading process from the CD 1 (or the writing process into the buffer memory A 8); an output signal of the attenuator A 14; and an output of the adder 11 (or output voice/audio data).

If the P-channel data is in a "High" state or if the skip command is detected by the system controller 7 while the track a of a CD 1 is being played (shown at (c) in FIG. 11), the cross-fading routine is started. In this arrangement, in the output signal of the adder 11 (at (e) in FIG. 11), the P-channel data "High", as one of the triggers defining the start timing of this operation is detected before the voice data of the CD 1 terminates because of time delay. In particular, the voice (audio) data just before the end of the music track on a CD 1, for example, is output from the adder 11 when a P-channel data "High" signal is supplied to the DSP6 being capable of detecting the P-channel. Thus, by utilizing this predetermined time lag, the cross-fading actions between the voice data just before the end of currently played music track and the voice data of the next music track is realized.

When the cross-fading procedure commences, the heading voice data of a music track b, for example, of the next program are read (at (a) in FIG. 11) from HDD 10. Simultaneously with this, the fade-out actions (at (d) of FIG. 11) of the output of the attenuator A 14 and the fade-in actions (at (b) in FIG. 11) of the output of the attenuator B 15 will begin, and then the outputs of these two attenuators A 14 and B 15 are mixed (at (e) in FIG. 11) by the adder 11.

Thus, the output from the adder 11 is created by overlapping both the heading portion of the track b (for example, the next voice/audio data stored in the HDD10) and the trailing portion of the track a (for example, the voice/audio data of the CD 1 being played) with each other. At this time, the voice data are continuously reproduced in the cross-fading actions by fading out/in each individual voice data. As a result, the music tracks, for example, can be naturally threaded without any interruption in music heard by the user.

It is necessary to ensure that the heading voice data of the next music track (from HDD 10) and the music portion succeeding this heading voice data are smoothly connected, so that the user does not recognize an interruption in the reproduction of this next music track. While the voice data of the heading of this track b, for example, is being reproduced from HDD 10, the pickup unit 2 searches the track b on the CD 1 to read an address An, and subsequent addresses of the track. The heading voice data has previously been recorded from addresses A0 to A(n−1) in the HDD 10, so the music data corresponding to the address An is synchronized by the adder 11. At this time, the attenuation of the attenuator A 14 is returned to a normal value.

Thus, the voice (audio) data of track a from the CD 1 and the voice (audio) data of the track b of the CD 1 are cross-faded, as illustrated at (e) in FIG. 11, and the voice (audio) data of the track b are matched to ensure proper synchronization and a smooth and continuous playback of the recorded track b to the user.

As discussed above, the cross-fading operation may also be utilized in arrangement in which heading data was not previously recorded in the HDD 10. In this arrangement, during the ordinary play routine of Step S62 in the flow chart of FIG. 9, the heading data recording method, as described in connection with the ordinary play routine of FIGS. 2 and 3, for example, may be applied to record the heading data into the HDD10.

In particular, in the normal reproduction routine at Step S62 of FIG. 9, the reading process from the CD 1 may be performed at the N-times faster speed discussed above, and the data may be sequentially recorded and stored in the HDD10 memory. In this procedure, the cross-fading routine is started when the P-channel "HIGH" mode is detected, as discussed above.

As explained in the foregoing description, by effectuating the cross-fading control using information configured by data groups and obtained from the recording medium, such as the CD 1, and the heading portion information stored in an internal memory, such as the HDD, an output signal can be continuously reproduced even when the CD 1 is being searched or replaced, for example, by efficiently utilizing the information stored in the internal storage, such as the HDD 10.

At the time of accepting the search command or the CD change command, by detecting one of (1) the trailing end of one the data groups (tracks), (2) the interval of the data groups (tracks), or (3) the leading end of the next data group (a data group or track reproduced after one of the data groups or tracks being reproduced), the fade-out operation is started on one attenuator whereas the fade-in operation started on the other attenuator. Then, output signals of these two attenuators are mixed by the adder, so that the overlap of the ending portion of the voice (audio) data being reproduced and the heading portion of the next voice (audio) data stored in the HDD 10 is executed, and the corresponding output signal is generated. At this time, the individual voice data sources are cross-faded out and in together so that the output voice (audio) data can be continuously and smoothly reproduced to the user without interruption in accordance with the principles of the instant invention. Besides employing the P-channel code of the sub-code in the CD format arrangement as discussed above, the PTT date in the DVD format may also be used for the cross-fading actions because the its timing commencement can be easily determined with the above-mentioned existing information.

As mentioned above, by both (1) overlapping the heading portion corresponding to a predetermined time period of the subsequent information to be reproduced, and stored in an internal storage such as the HDD 10, over the trailing portion of information being reproduced by a player from a CD 1, for example, and (2) utilizing a fade in and fade out process, an apparatus having the player and the internal storage discussed above can generate an continuous output signal. As a result, this invention provides a new advantageous feature that results in the data groups on a recording medium (such as chapters, tracks, songs, or programs, for example) can be naturally reproduced continuously without any audible interruption to the user.

The instant invention has been described in particular examples above associated with a CD changer/magazine arrangement, but could be likewise exemplified by a changer of another type of recording medium such as a MD or DVD. Moreover, similar effects could be obtained even if the invention is applied not only to recording medium changer/magazine arrangements, but also to ordinary single disc players of those recording media. Furthermore, the invention could be suitably applied to video signals instead of, or in addition to, audio signals.

According to the instant invention, as described above, by executing the cross-fading operation, in which information obtained from the recording medium (such as the CD 1) and a portion of the heading information stored in the internal memory (such as the HDD 10) are both used, data of groups stored in the recording medium are reproduced continuously, even when another group in the set of groups on the medium are being searched. Even in the case where another recording medium is being replaced, such as in a recording medium changer arrangement, the same continuous reproduction effect is realized. The information stored in the internal storage, such as the HDD 10, can be efficiently employed, as described above to reach these advantageous effects in accordance with the principles of the instant invention.

Moreover, by detecting one of (1) the trailing end of a data group on the CD 1 (such as a music track or a chapter), (2) the music interval, or (3) the leading end of the next data group on the CD 1, the fade-out step is commenced on one attenuator whereas the fade-in step is commenced on another attenuator, and these two attenuator outputs are mixed by an adder, corresponding to the search command or the CD change command, so that an overlapped signal of the ending portion of the voice data being reproduced and the heading portion of the next voice data stored in the HDD is output. At this time, the individual voice data are cross-faded out and in, so that the voice data can be continuously reproduced to the user without interruption. By employing the P-channel data of the sub-code in the CD format, as discussed above, the cross-fading action can be commenced so that the timing for starting it can be easily determined with this existing information.

By overlapping the heading portion corresponding to the predetermined time period (portion) on the subsequent information to be reproduced (and stored in an internal storage means such as the HDD 10) over the trailing portion of information currently being reproduced, continuous reproduction without any interruption is realized in a fade in/out manner.

In summary, the instant invention provides a reproducing device capable of seamless reproduction by threading data groups (such as chapters, tracks, or songs) from a recording medium without any interruption of natural continuity being apparent to a user. A control means 7 reproduces voice data continuously in a cross-fading functionality to thread data groups naturally without any interruption, by outputting the voice data currently being reproduced to overlap the heading portion of the next voice data to be reproduced, as stored in an internal storage means 10 such as an HDD, over the trailing portion of the former voice data, and by fading out/in each of these individual voice (audio) data sources. These fade out/in actions are effected by controlling the amplification and attenuation of attenuators, as shown in the arrangement of FIG. 1, for example, and are timed by using, for example, the P-channel of the CD format and/or the PTT of the DVD format.

While the invention has been described in detail and with reference to specific embodiments thereof, it will be apparent to one skilled in the art that various changes and modifications can be made therein without departing from the spirit and scope thereof. For example, an embodiment of the invention has been exemplified above in connection with a CD changer arrangement. However, the invention could be likewise utilized in connection with an MD (minidisc) changer. Moreover, similar effects could be obtained even if the invention is applied outside the area of recordable media changers, for example, with an ordinary, single disc player of those recording media. Even further, the instant invention could be suitably applied to video other than the audio applications. Thus, it is intended that the present invention cover the modifications and variations of this invention provided they come within the scope of the appended claims and their equivalents.

What is claimed is:

1. A reproducing apparatus comprising:
   a memory configured to store at least heading portions of respective data groups from one or more data groups recorded on a recording medium;
   a reproducing device configured to read at least the heading portions of one or more of the data groups from the recording medium; and
   a controller configured to control the memory and the reproducing device, and configured to execute a cross-fading operation, in which a portion of at least one of the data groups being reproduced from the memory are cross-faded with a portion of at least one of the data groups being reproduced from the recording medium by the reproducing device.

2. The reproducing apparatus according to claim 1, further comprising:
   a detector configured to generate a detection signal that indicates when the cross-fading operation is to commence,
   wherein the controller commences the cross-fading operation on the basis of receiving the detection signal from the detector.

3. The reproducing apparatus according to claim 2, wherein the detector generates its detection signal based on a detection of a leading end of at least one of the data groups being reproduced from the memory.

4. The reproducing apparatus according to claim 2, wherein the detector generates its detection signal based on a detection of a trailing end in at least one of the data groups being reproduced from the recording medium.

5. The reproducing apparatus according to claim 2, wherein the detector generates its detection signal based on a detection of an interval between data groups being reproduced by the reproducing apparatus.

6. The reproducing apparatus according to claim 2, wherein the detector generates its detection signal based on a detection of an activation of a search mode.

7. The reproducing apparatus according to claim 2, further comprising:
   a first attenuator configured to attenuate information read from the recording medium;
   a second attenuator configured to attenuate information output from the memory; and
   an adder configured to add output signals from each of the first and the second attenuators,
   wherein the controller is further configured to control the attenuation of each of the first and second attenuators based on the detection signal, so that an output signal from the first attenuator is faded out while an output signal of the second attenuator is faded in.

8. The reproducing apparatus according to claim 1, wherein the memory stores only the respective heading portions of at least one of data groups recorded on the recording medium.

9. The reproducing apparatus according to claim 1, further comprising:
   a buffer memory coupled to the reproducing device and the memory, wherein the controller is further configured to control the buffer memory so that data read from the recording medium are stored in the memory via the buffer memory.

10. The reproducing apparatus according to claim 1, further comprising:

a detector configured to detect whether a recording medium is being loaded into the reproducing device for the first time, wherein the controller is further configured to inhibit storing at least heading data read from the reproducing device to the memory if the recording medium being loaded into the reproducing device has already been loaded into the reproducing device.

11. The reproducing apparatus according to claim 1, wherein the reproducing device is further configured to read the heading portion data of each of a plurality of the data groups from memory after reading a specific amount of data at least in order to reproduce a currently selected data group, wherein the memory is configured to store both the heading portion data and the specific amount of data, and wherein the controller is further configured to control the memory so that the heading portion data for the respective data groups stored in the memory are read, in order, when a scan mode is entered.

12. The reproducing apparatus according to claim 1, wherein the reproducing device is further configured to read the heading portion data of each of a plurality of the data groups from memory after reading a specific amount of data at least in order to reproduce a currently selected data group, wherein the memory is configured to store both the heading portion data and the specific amount of data from the reproducing device, and wherein the reproducing device continues to supply data to the memory in order to reproduce the currently selected group continuously so long as the residual data stored in memory is less than a predetermined level.

13. A method for continuously outputting data via a reproducing apparatus comprising:

storing at least heading portions of respective data groups from one or more data groups recorded on a recording medium into a memory associated with the reproducing apparatus;

reproducing at least the heading portions of one or more of the data groups from the recording medium via a reproducing device associated with the reproducing apparatus; and causing a portion of at least one of the data groups stored in the memory to be reproduced from the memory and cross-faded with a portion of at least one of the data groups being reproduced from the recording medium by the reproducing device.

14. The method of claim 13, further comprising:

generating a detection signal that indicates when the cross-fading operation is to commence.

15. The method of claim 14, wherein the detection signal is generated based on a detection of a leading end of at least one of the data groups being reproduced from the memory.

16. The method of claim 14, wherein the detection signal is generated based on a detection of a trailing end in at least one of the data groups being reproduced from the recording medium.

17. The method of claim 14, wherein the detection signal is generated based on a detection of an interval between data groups being reproduced by the reproducing apparatus.

18. The method of claim 14, wherein the detection signal is generated based on a detection of an activation of a search mode.

19. The method of claim 14, further comprising:

providing a first attenuator configured to attenuate information read from the recording medium;

providing a second attenuator configured to attenuate information output from the memory;

providing an adder configured to add output signals from each of the first and the second attenuators; and controlling the attenuation of each of the first and second attenuators based on the detection signal, so that an output signal from the first attenuator is faded out while an output signal of the second attenuator is faded in.

20. The method of claim 13, wherein the memory stores only the respective heading portions of at least one of data groups recorded on the recording medium.

* * * * *